United States Patent
Hicks et al.

(10) Patent No.: US 7,916,906 B2
(45) Date of Patent: Mar. 29, 2011

(54) SYSTEM AND METHOD FOR PROVIDING A REAL-TIME, ONLINE BIOMETRIC SIGNATURE

(75) Inventors: Bill Hicks, Fort Lauderdale, FL (US); Dave Liscum, Lighthouse Point, FL (US)

(73) Assignee: SignatureLink, Inc., Fort Lauderdale, FL (US)

( * ) Notice: Subject to any disclaimer, the term of this patent is extended or adjusted under 35 U.S.C. 154(b) by 597 days.

(21) Appl. No.: 11/312,397

(22) Filed: Dec. 21, 2005

(65) Prior Publication Data

US 2006/0159313 A1     Jul. 20, 2006

Related U.S. Application Data

(63) Continuation-in-part of application No. 11/205,002, filed on Aug. 17, 2005.

(60) Provisional application No. 60/593,210, filed on Dec. 21, 2004.

(51) Int. Cl.
*G06K 9/00* (2006.01)

(52) U.S. Cl. ...................................... 382/119
(58) Field of Classification Search ............ 382/119
See application file for complete search history.

(56) References Cited

U.S. PATENT DOCUMENTS

| | | | |
|---|---|---|---|
| 4,835,372 A * | 5/1989 | Gombrich et al. ........... 235/375 |
| 5,297,202 A | 3/1994 | Kapp et al. |
| 5,432,326 A | 7/1995 | Noblett, Jr. et al. |
| 5,677,955 A | 10/1997 | Doggett et al. |
| 5,680,470 A | 10/1997 | Moussa et al. |
| 5,689,567 A | 11/1997 | Miyauchi |
| 6,687,390 B2 | 2/2004 | Avni et al. |
| 6,694,045 B2 | 2/2004 | Chung et al. |
| 6,721,716 B1 * | 4/2004 | Gross ............................ 705/40 |
| 6,757,826 B1 | 6/2004 | Paltenghe |
| 6,904,416 B2 | 6/2005 | Nassiri |
| 6,907,529 B1 | 6/2005 | Hirose |
| 6,990,585 B2 | 1/2006 | Maruyama et al. |
| 7,080,047 B2 | 7/2006 | Kan |
| 7,096,365 B1 | 8/2006 | Hamann et al. |
| 7,349,871 B2 * | 3/2008 | Labrou et al. ................. 705/26 |
| 2001/0051996 A1 | 12/2001 | Cooper et al. |
| 2002/0042879 A1 | 4/2002 | Gould et al. |
| 2002/0042885 A1 | 4/2002 | Eskandarian |

(Continued)

FOREIGN PATENT DOCUMENTS

WO    03/063093 A2    7/2003

OTHER PUBLICATIONS

Java-Based Internet Biometric Authentication System by Ross A.J. Everitt et al., "IEEE Transactions on Pattern Analysis and Machine Intelligence", vol. 25, No. 9, Sep. 2003, pp. 1166-1172.

(Continued)

*Primary Examiner* — Vikkram Bali
*Assistant Examiner* — Elisa M Rice
(74) *Attorney, Agent, or Firm* — Rothwell, Figg, Ernst & Manbeck (57) ABSTRACT

A system is provided for generating an online biometrically accurate electronic signature. The system includes a computer interface module which records movement of a cursor on a computer screen and outputs the recorded data. A signature generation module which receives the recorded data and generates a graphical image based upon the recorded data.

7 Claims, 6 Drawing Sheets

U.S. PATENT DOCUMENTS

| | | | |
|---|---|---|---|
| 2002/0053028 | A1 | 5/2002 | Davis |
| 2002/0077974 | A1 | 6/2002 | Ortiz |
| 2003/0105674 | A1 | 6/2003 | Howell et al. |
| 2003/0138135 | A1 | 7/2003 | Chung et al. |
| 2003/0191715 | A1 | 10/2003 | Pinizzotto |
| 2004/0095384 | A1 | 5/2004 | Avni et al. |
| 2005/0216742 | A1 | 9/2005 | Wong et al. |
| 2005/0223234 | A1 | 10/2005 | McOwan et al. |
| 2006/0212707 | A1 | 9/2006 | Cahill |
| 2006/0212708 | A9 | 9/2006 | Wong et al. |
| 2006/0224898 | A1 | 10/2006 | Ahmed |

OTHER PUBLICATIONS

On-Line Signature Verification by Anil K. Jain et al., "Pattern Recognition" The Journal of the Pattern Recognition Society, 2002, vol. 35, pp. 2963-2972.

On-Line Signature Verification: Discrimination Emphasised by Ronny Martens et al., IEEE, 1997, pp. 657-660.

A Pen Input On-Line Signature Verifier Integrating Position, Pressure and Inclination Trajectories by Yoshimitsu Komiya et al., IEICE Tilans. Inf & Syst, vol. E84-D, No. 7, Jul. 2001, pp. 833-838.

Sign on the Dotted Line in Cyberspace—With SecureDollar.com Biometric Signature Technology; Ideal Solution for Online Merchants as Added-Layer of Security, SecureDollar.com Sign-with-Mouse Application Can Be Demonstrated at www.securedollar.com, PR Newswire, NA, Sep. 9, 2003, 2 pages.

Syukri, Agus, et al., "A User Identification System Using Signature Written with Mouse," 1998, Springer-Verlag Berlin Heidelberg, ACIPS'98 LNCS 1438, pp. 403-414.

Mexican Language Version of Office Action for Mexican Patent Application No. MX/a/2007/007539 dated Jun. 3, 2010, 4 pages.

English Language Translation of Office Action for Mexican Patent Application No. MX/a/2007/007539, dated Jun. 3, 2010, 4 pages.

* cited by examiner

Automatic Debit Information

- *Amount of Initial Payment:
- *Date of Initial Payment to be made:
- *Day of all recurring payments:
- *Monthly fee amount to be debited:
- *Bank Name:
- *Name of Account Holder:
- *Account Holder Address:
- *City, State, Zip:
- *Routing Number:
- *Account Number:
- *Account Holder Phone Number:
- *Last 4 digits of Social Security Number:
- *Checking or Savings?:
- *Your Email Address:

Enter your Name and Email address, sign your name in the space below with your mouse, and click Validate.

Your name:
Email Address:

X __________________

Clear     Validate www.SignatureLink.com™ Copyright 2004 SignatureLink, Inc. patent pending Submit

This is an example of the resulting signature.gif file displayed at the bottom of a contract on the signup Thank you page.

- Company will report any outstanding balances to the three main credit bureaus.

- Company will have the incident reported to anti-fraud databases, which will prevent any further purchases on the Internet.

- Company has a chargeback legal department and WILL file suit immediately if necessary.

Terms & Conditions are subject to change.

---

Home  Email  Contact Us  About Us  Get to the top  Login
FAQ's  Testimonies  Cattledrive Mail  Pop Behind Stampede CattleDriver™ Cattledriver.com™ Copyright 1999-2004

SYSTEM AND METHOD FOR PROVIDING A REAL-TIME, ONLINE BIOMETRIC SIGNATURE

CROSS-REFERENCE TO RELATED PATENTS

This application is a Continuation-In-Part of and claims priority to U.S. application Ser. No. 11/205,002 filed on Aug. 17, 2005, and claims priority to U.S. Provisional Application No. 60/593,210 filed on Dec. 21, 2004, the entire contents of each of which are hereby incorporated by reference.

BACKGROUND OF THE INVENTION

1. Field of the Invention

The present invention relates generally to systems and methods for recording a real-time, online biometric signature. More particularly, the present invention relates to a creating, recording and securing an electronic signature over the Internet, such as via a web browser.

2. Description of the Related Art

Since the outset of the Internet, electronic commerce has proliferated dramatically. It is now common place to transact all types business over the Internet. Retail sales have benefited from the Internet, and now most merchants have web sites that allow online purchasing via a website or online catalogue. All that is needed to complete a purchase is access to the Internet and a credit card.

Online merchants are handicapped by the lack of a written contract signed by its customers. If an online purchaser disputes a credit card transaction, the merchant will not have a signed contract to prove the legitimacy of the transaction. As a result, online vendors are exposed to undue risk. Accordingly, there is no current method to secure the signature in its natural state as captured in real-time, complete with its unique biometric characteristics, in order to ensure that a customer consciously executed the transaction.

Thus, there is a need for systems and methods for generating and capturing biometric electronic signatures for online transactions.

SUMMARY OF THE INVENTION

According to an embodiment of the present invention, a system is provided for generating an online, biometrically accurate electronic signature. The system includes a computer interface module which records movement of a cursor on a computer screen and outputs the recorded data. A signature generation module is also included which receives the recorded data and generates a graphical image based upon the recorded data.

According to another embodiment of the present invention, a method for capturing a real-time online electronic, biometrically accurate signature is provided. The method can include a step of downloading online content to a client computer interface. As a result of the downloading, a signature block is displayed on the client computer interface. The signature block captures coordinate data from a computer peripheral device. A graphical image of a signature is generated from the coordinate data.

According to another embodiment of the present invention, a system is provided for a real-time online electronic, biometrically accurate signature. The system may include a web server configured to store and transmit online content, a client interface and a signature capture program. The client interface may be configured to access the web server and download and display the online content. The signature capture program may be configured to display a signature block on the client interface, to capture coordinate data of a computer cursor within the signature block, and to generate a signature image based on the captured coordinate data.

According to another embodiment of the present invention, a system is provided for capturing a real-time online electronic, biometrically accurate signature via a web browser on a client computer interface. The system includes a signature capture program configured to display a signature block on the client interface within the web browser, to capture coordinate data of a computer cursor within the signature block, and to generate a signature image based on the captured coordinate data.

According to another embodiment of the present invention, a system is provided for generating a real-time online electronic, biometrically accurate signature. The system may include means for interfacing with a client computer, recording movement of a cursor on a computer screen and outputting recorded coordinate data. The system may also include means for receiving the recorded coordinate data and generating a graphical image based upon the recorded coordinate data.

According to an embodiment of the present invention, a web browser for displaying online content is provided. The web browser includes a computer interface module which records movement of a cursor on a computer screen and outputs the recorded data. The web browser further includes a signature generation module which receives the recorded data and generates a graphical image based upon the recorded data. The web browser further includes means for invoking the computer interface module such that online content displayed with the web browser can invoke the computer interface module.

The invention maybe used to capture signatures, especially over the Internet. Signatures can be stored as a graphic image file for further viewing. The present invention may also be used to capture drawings or sketches to be used for later use.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The main component of the present invention is a program, application, module, component or the like that displays a signature pad on a computer screen (e.g., within a web browser window) and captures signatures input via a mouse or other peripheral device (e.g., writing pad, keyboard arrows, touch pad, etc.). The signature pad is preferably a stand-alone Macromedia Flash program, but could be programmed in other languages such as, but not limited to, JavaScript, ActiveX, MS Sparkle, MS Net, MS Longhorn, Vista, etc. The signature pad may be executed by a hosting application (e.g., web browser) or the like and can be called from any application, such as from an HTML, XML, or XAML page, or may be a browser plug-in.

Preferably, the signature pad is configured to capture a raw signature (i.e., biometric signature) and generate a graphical image thereof. The signature pad preferably stores captured signature data securely (in a read only format), such as locally in a file, database, etc. for further viewing of the signature, generate a graphic image file of the signature, or transmit the signature data (e.g., as a character string) to a remote server for secure storage, creation of a graphic image file, or for viewing. Optionally, stored signatures or signature data could be edited, but this is not a preferred option since the biometrically accurate signature is desired. The signature data may be captured as coordinate or pixel data, or coordinate or line data (e.g., beginning and end points, line length, and angle degrees, etc.).

By making the signature pad a stand alone application, such as a Flash program, the signature may be captured on its own, without submitting an accompanying HTML form or the like. The signature pad may be further configured to notify a site or server (e.g., a merchant web server) when the signature has been properly captured and optionally, whether the signature is verified against a signature on file. Additional information may be captured along with the signature.

Figure 1:
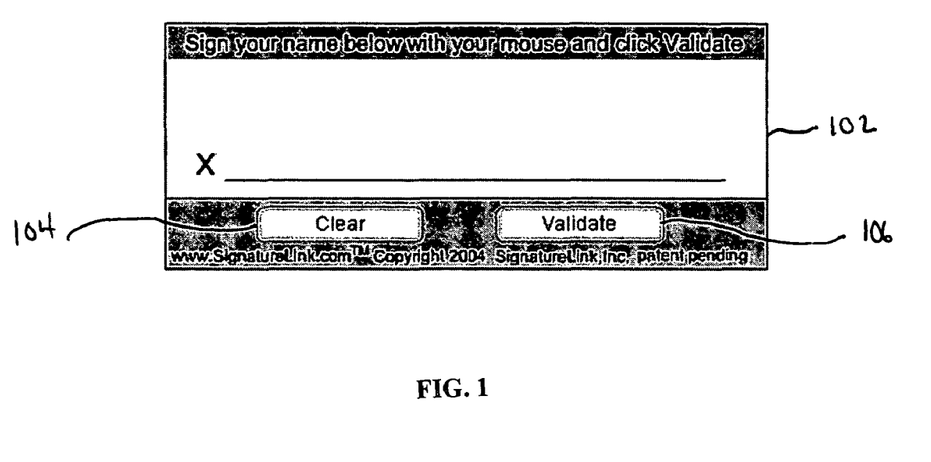
FIG. 1 is view of a signature block according to an embodiment of the present invention.

FIG. 1 shows an exemplary embodiment of the present invention. A signature block (signature pad/box) 102 can be displayed on a computer screen, such as within a web browser window. The signature block 102 is preferably generated by a Flash or MS Sparkle program and can be part of a larger form object 100 that can include text, graphics or fields for other data entry.

The signature pad 102 may be displayed on the computer screen in any shape (e.g., rectangle-shaped) and is configured to allow the computer user to draw, for example, to sign their name or initials. For aesthetic reasons, it may be preferable to include a signature block that is sized to match a corresponding form or web page. The signature pad 102 may appear, for example, on an Internet shopping cart or web form. The preferred functions of the signature pad are:

Draw: to write the signature

Clear: to erase a signature ("Clear" button 104)

Submit or Validate: to send, submit, store or validate the signature ("Validate" button 106).

The signature pad 102 is configured to capture the coordinates input from a peripheral device, such as a mouse or other pointing device. The capture process preferably outputs x and y coordinates of the location of the windows cursor within the signature pad 102. The captured coordinates may then be used to create a graphical image of the raw signature (i.e., biometrically accurate signature). The coordinates or the graphical image file or both could be stored for later use. Preferably, the signature data is stored as line data, e.g., beginning and end points, line length and angle degrees. Stored signature data is preferably secure and could be used to generate a graphic image file (gif) or other image file (e.g., .bmp, .jpg, etc.), when finally completed.

Preferably, signatures are displayed within signature pad 102 while the user is entering the signature. For example, the signature pad 102 could be configured to use a computer mouse input to generate a signature. When the left mouse button (not shown) is depressed, and the windows cursor is within the signature pad 102, the coordinates of the mouse cursor can be captured by signature pad 102 and simultaneously displayed therein to the user via a program display function (e.g., Flash line LINETO command), so that the user can see the signature as it is being written. Captured signatures, signature data, graphical objects, etc. may be accessed by any means, such as online through a web page or link.

Preferably, the graphical image of the biometric signature and/or the raw signature data is transmitted to a remote server for storing. The image or signature data is preferably stored in a file format and can be assigned an URL address for convenient access. As mentioned above, the signature may be captured and stored independent of any other application. Therefore, if the signature is captured in connection with a merchant web site or the like, the present invention may be configured to notify the merchant when the signature has been submitted, if there is an error, and even whether the signature is verified, such as against a stored signature. For example, the signature pad 102 or remote server (see FIG. 4) may be configured to provide the URL of the stored signature to the merchant or party requesting the signature data. Files are preferably stored with advanced encryption methods for security.

Figure 2:
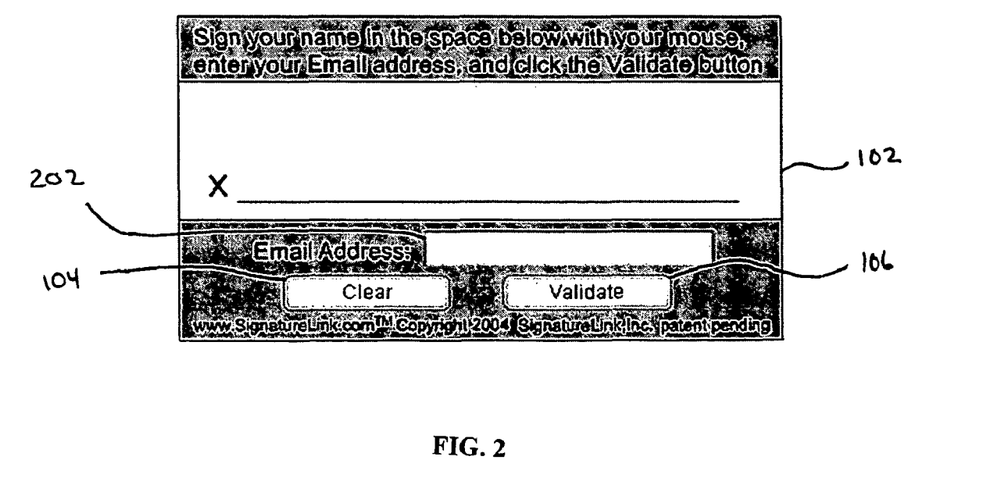
FIG. 2 is a view of a signature block including an email address-form field, according to another embodiment of the present invention.
Figure 7:
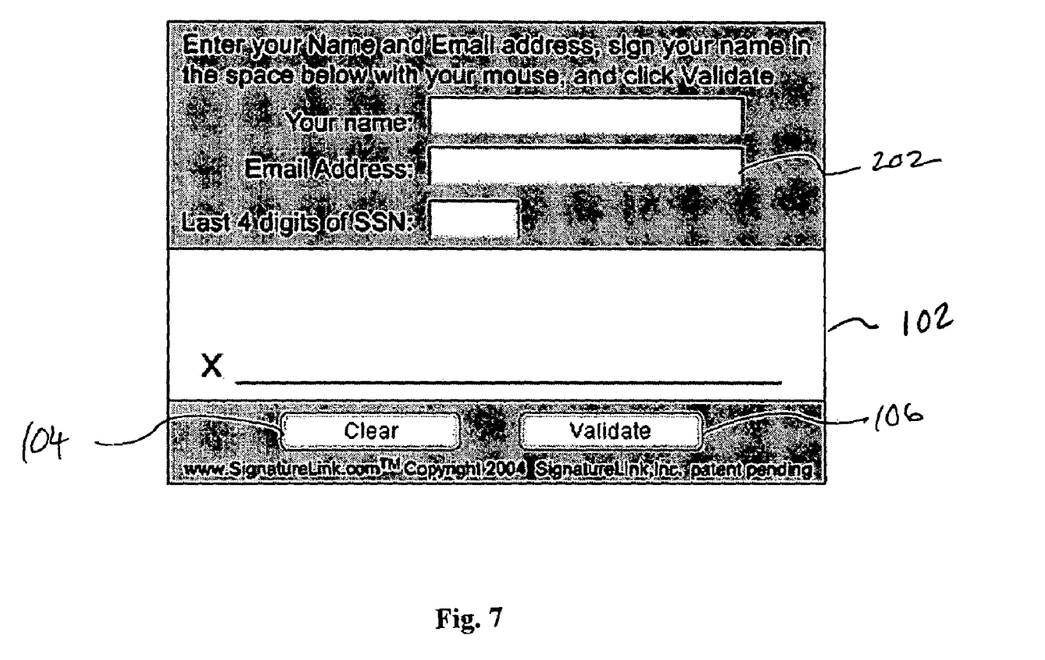
FIG. 7 is a view of a signature block including additional form fields according to another embodiment of the present invention.

The signature coordinates or graphic image may be submitted and/or stored along with any additional accompanying data, which could be used to identify the signature or signer. For example, as shown in FIG. 2, a form field to enter the Email Address could be included in a separate block 202. Any data could be stored or captured with a signature. For example, one or more of the following: a Client ID, Customer ID, an IP address, a Session ID, an email address, and Company ID, SSN, EIN, SIN, etc. See also FIG. 7. This additional data may be supplied by the signer by typing the information into form fields (on the signature pad itself or in the hosting application, such as the web browser HTML code), or it may be embedded in HTML or code or a client program used to host or display the signature pad 102. If required data is missing or invalid, the signature capture process could be configured to display an appropriate error message to the user in the form of a dialog box, web page, etc.

Figure 3:
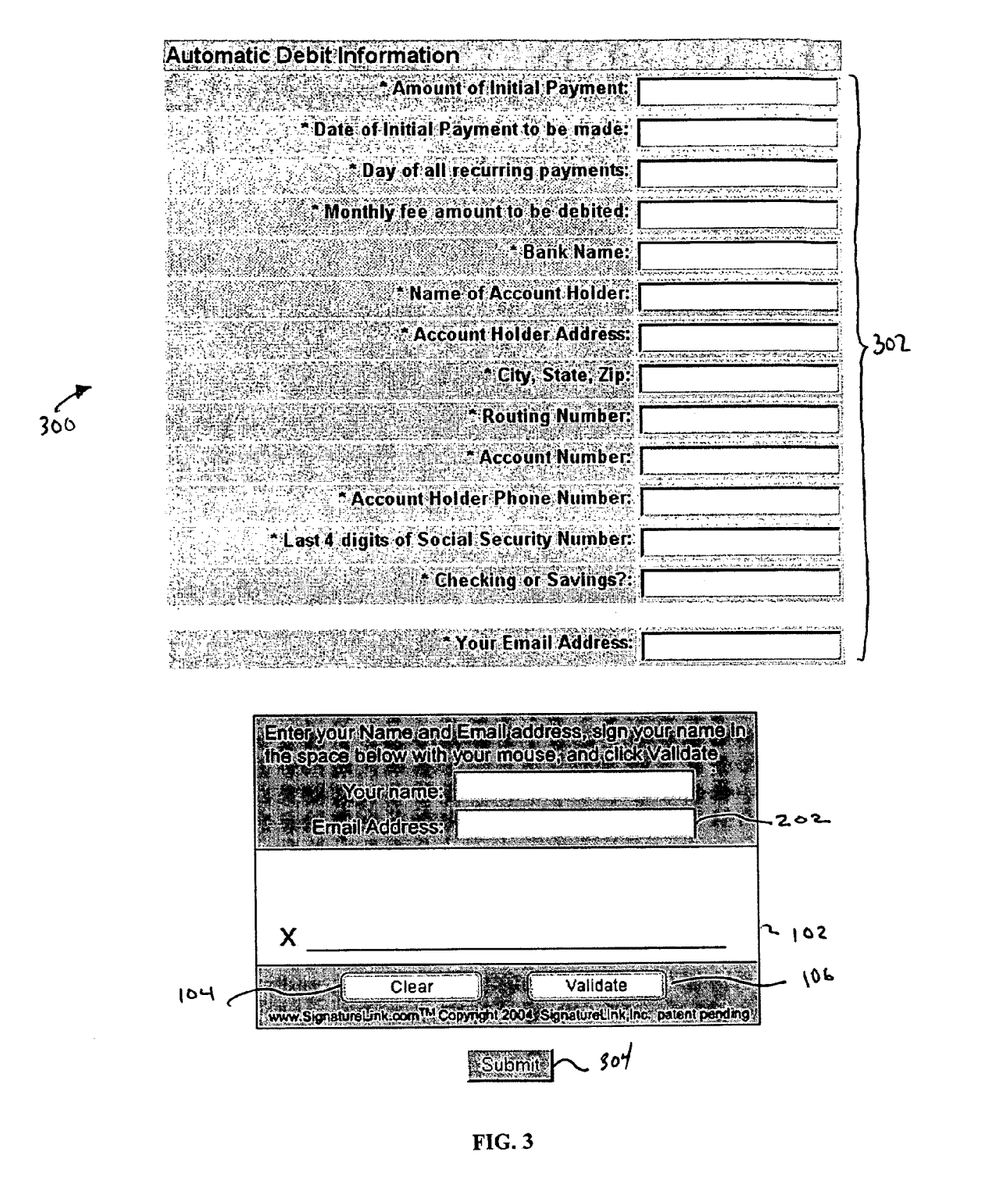
FIG. 3 is a view of a signature block including additional form fields according to another embodiment of the present invention.

Another example is shown in FIG. 3. An HTML form 300 includes fields 302 for entry of City, Location, Zip, Phone, 800#, and Fax number. The drawing pad 102 has a Submit button 304 below it. If the Submit button 304 is depressed before all the fields are filled in or before the signature is drawn, an error message could be generated. Alternatively, the signature can be submitted irrespective of whether all the HTML form fields 302 have been filled in and the HTML form can be submitted separately.

Note that the present invention can operate independent from an HTML page. Further, the present invention is not limited to integration with an HTML page and the functionality of the signature pad 102 can be integrated with other programs, such as XML, XAML, MS Sparkle, MS Net, etc.

When additional data is supplied, the data could be captured with the signature. In the alternative or in addition thereto, it may be stored, for example in a database, to aid in future lookup of the captured signature. The signature and its accompanying data could be submitted independently from the hosting application form. If it is submitted to the server with the form, the server may redirect or download a web page to the client. If it is submitted independently, the hosting application or the signature capture program may display a message, such as a dialog box, to the user and/or redirect the user when the signature has been successfully received by the server or if there is an error.

The signature or drawing can be captured on the client side, for example, with program executed on the client PC, for example, by a web browser. The program could comprise written instructions in any computer programming language having the appropriate capabilities, but is preferably designed specifically for online (e.g., Web) applications, such as HTML, XAML, Flash, JavaScript, MS Sparkle, MS .Net, MS Longhorn, Vista, etc. The program can be configured to record x and y coordinates of the signature, which may be used for viewing, secure storage or editing, and/or send the signature data in the form of pixel data, or coordinate or line data (e.g., begin and end points, line length, and angle degrees, etc.), to a server for viewing/editing/storage. An image generation program or module may use the coordinates to create the signature or drawing as a graphic image, which can be stored as a file on a file system, possibly for access online or in a database.

One skilled in the art will understand that the signature capture and image generation processes could be combined and implemented by a single computer program or by several separate components residing together or remote from each other. For example, a Flash program could be downloaded (e.g., with or from an HTML page) to capture the signature data and send the data to a remotely located program, which generates the image of the signature.

The signature may be submitted as part of a hosting program form or transmitted transparently and independently from a hosting application for, or uploaded to a server as coordinates, for example, in an ASCII delimited character string as x/y coordinates or as line data comprising begin and end points of each straight line or angle degree and line length, or as a graphic image file. A server may use the coordinates to create a graphic image file, and may store the graphic image file or signature data for future display or editing.

Once the signature has been recorded and submitted at the client side, a "Thank You" message could be delivered to the client. For example, the client could be redirected to a web page, a "pop-up" or dialogue box could be displayed, etc. This message could be generated by server-side script or called from the client.

Signatures can be validated by comparing the generated signature or signature data against a stored signature or stored signature data. The stored signature or stored signature data could be identified by using additional data, such as email address or name, or a unique ID such as a client ID or session ID, which could be embedded as a parameter in an hosting application form (e.g., HTML or XAML) that loads the signature pad application or typed directly into the hosting application form or signature pad form field(s) so that both the hosting application and the signature pad application send the same ID to the server. This ID could be used by the merchant or other entity requesting the signature, to access the stored generated signature.

The client and/or the merchant could receive the Thank You via an email generated by the signature pad or by a server script. Such an email could contain links(s) to and/or attachment(s), such as an HTML, PDF, or WORD document, containing information related to the signature, such as a graphical image of the signature, additional signature data, a receipt, the signed document, verification that the signature was recorded properly or matches a signature on file, etc.

Figure 4:
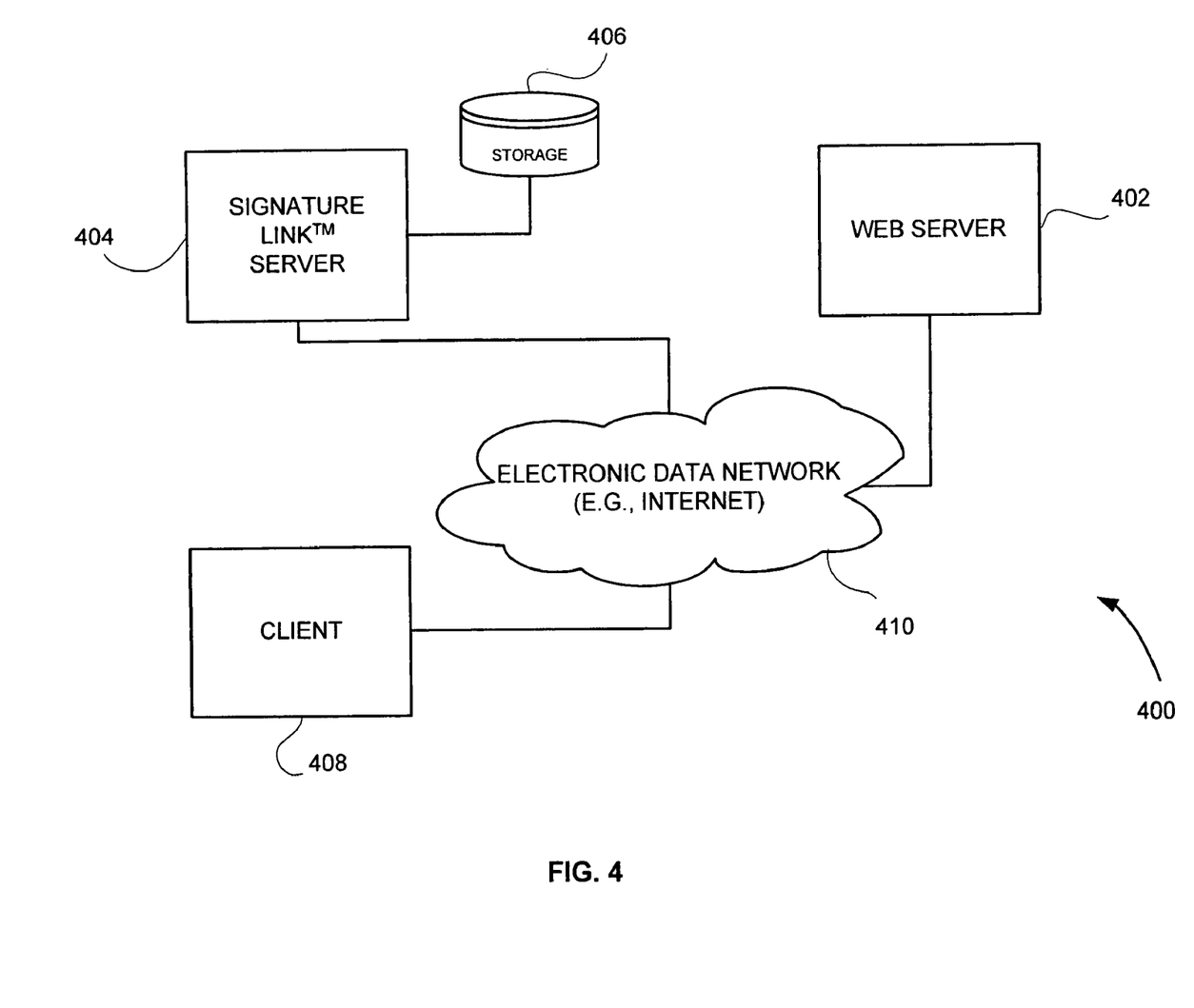
FIG. 4 is a block diagram of a system for capturing a real-time online electronic, biometrically accurate signature according to an embodiment of the present invention.

The present invention may be used in nearly any type of computer architecture configuration, such as stand-alone or client/server program, application, or component. As an example, FIG. 4 is a block diagram of a system for capturing online electronic signatures according to an embodiment of the present invention.

As shown, the system 400 could include a web server 402 (e.g., "merchant" server), a signature link server 404 coupled with a storage device 406, and a client interface 408, each coupled with or otherwise in communication with an electronic data network 410, such as the Internet.

The web server 402 may be configured to provide online content such as HTML pages, java programs, streaming broadcast data or multimedia services, etc. Such content maybe accessed and displayed, played, executed, etc. by client 408, such as via a web browser such as INTERNET EXPLORER. Within the content to be displayed may be a call, such as an embedded object request, which causes the client 408 to access the signature link server 404 and download a program element configured to display a signature block, such as described above with respect to FIGS. 1-3. The client 408 executes the program, such as within a web browser, and the user may enter a signature, such as via a peripheral device, such as a computer mouse. The client displays and captures the biometric signature of the user as described above. The signature data may be stored locally or transmitted directly to the signature link server 404, which can be configured to generate a graphical image of the signature. Otherwise, a graphical image of the signature could be generated locally and transmitted to the signature link server 404.

The signature link server 404 can store signature data (e.g., coordinate, pixel or line data) or signature images in a storage device 406, which may be part of the server or a separate data storage device. As described above, additional data can be stored with the signature image (e.g., in the image itself, in a text file on the file system, etc.) or in a database. For example, additional form data may be transmitted to the signature link server 404 along with the signature data and/or a graphical image. The additional form data could be stored in the storage device 406, such as in a database, and linked to the graphical image of the signature or to the signature data.

Preferably, the signature data and/or image files can be made accessible via the electronic data network 410. Alternatively, signature data, additional data, and/or graphical images could be transmitted directly to the web server 402 from the client 408.

Figure 5:
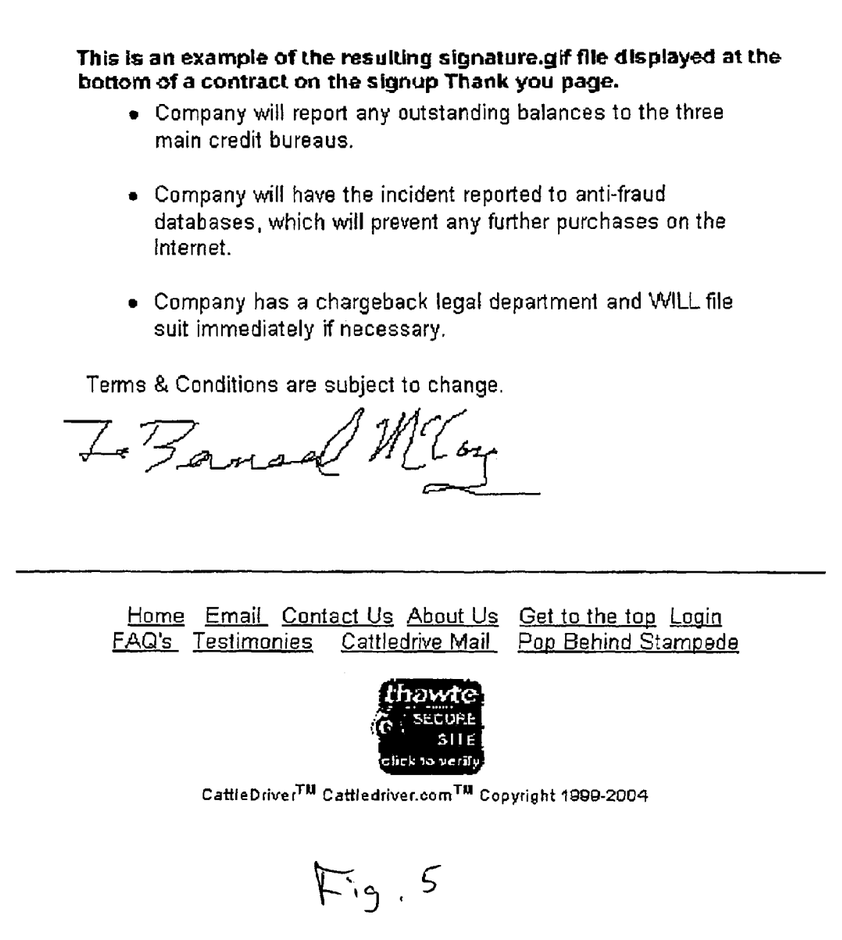
FIG. 5 is a screen shot of a signature image generated according to an embodiment of the present invention.

The generated image can be a signature only, or may include other elements, such as text element related to contract terms or other information associated with an online transaction. For example, as shown in FIG. 5, several clauses are combined with the signature to form an online electronic signed contract.

After the signature and optional data is received by the server, the server may save and/or display the receipt of the transaction or the agreement text for which the signature was required. For instance, when making a purchase online, the resulting "Thank You" page may DISPLAY the details of your order along with the signature image embedded in the HTML as a signed receipt for the customer to print for future reference. This data may be optionally re-displayed with a dynamic webpage that gathers the data from storage and displays it preferably as HTML along with the embedded signature image. This data could optionally be stored as a static HTML webpage on the server for future reference, especially for the merchant to print off in case of a credit card chargeback dispute.

As another example, when submitting a signature in order to agree to an agreement or Terms & Conditions, the next page could display the agreement or Terms & Conditions with the signature image embedded at the bottom of the webpage. In other words, the FIG. 5 "Thank You" page could store the agreed-upon text and/or accompanied data within the signature graphic image file itself or as text on the webpage along with the signature graphic image file.

Since the signature capturing process is independent, it may be necessary to interact with a corresponding process. For example, consider the case where an online merchant desires that a signature be recorded in connection with online purchases made from its website. In this case, client 408 downloads an HTML page from merchant server 402 in order to purchase merchandise online. At some point in the purchase process, a signature will be required. The merchant HTML page can call the signature program, which can be downloaded from the signature server 404 and then executed in a web browser of client 408. For example, when payment information is being entered, before submission of the information, the signature may be recorded. Accordingly, client 408 displays and captures the biometric signature of the user as described above. The signature data may be stored locally or transmitted directly to the signature link server 404, which can be configured to generate a graphical image of the signature. Otherwise, a graphical image of the signature could be generated locally and transmitted to the signature link server 404.

Now, before the payment information is submitted to the merchant or third party system to consummate an online transaction, it may be desired that the signature be confirmed or even validated. In this case, the merchant HTML page can be prevented from being submitted until the signature is confirmed or validated by the signature server 404. For example, a required browser cookie or hidden field in an HTML page might only be populated when the "Thank You" message is generated by signature server 404. This way, no online transaction can occur without a confirmed biometric signature being recorded. The hosting application form with the required field or browser cookie may optionally be submitted to the server 402 (e.g., a merchant web server), which checks to make sure that the required fields have been set or filled, and may optionally display an error message or the received data and/or signature as a receipt. The signature may be displayed in the "Thank You" page as an embedded HTML IMG tag linked to the URL of the signature, which may reside on signature server 104 or be retrieved to the server 402. The value of the required field or the unique ID may be used in the image URL/file naming convention, so the server 402 knows the URL to the signature image file.

In order for the signature image to be retrieved securely from the server 404, either by the client 408 or server 402, the receiving party may be authenticated. Such authentication could include, but is not limited to, (1) checking to see if the retrieval request is from someone logged in to the server 404 with the appropriate account; (2) checking to see if the retrieval request is from the same IP address as the original signer within a limited period of time; (3) checking to see if the retrieval request is from a previously designated IP address, such as of a merchant, as configured by the server 404; or (4) checking to see if the retrieval request is from someone using the same session or browser cookie as the original signer within a limited period. HTTPS and/or SSL secure certificates, or the like, may be used when transmitting data between computers. The servers 404 and 402 may be the same server in some embodiments. Further, when the signature or data file are stored, they can been stored encrypted by standard encryption techniques. When, the signature or file is retrieved, standard decryption techniques can be used to decrypt the signature or file before it is sent to the retriever.

Figure 6:
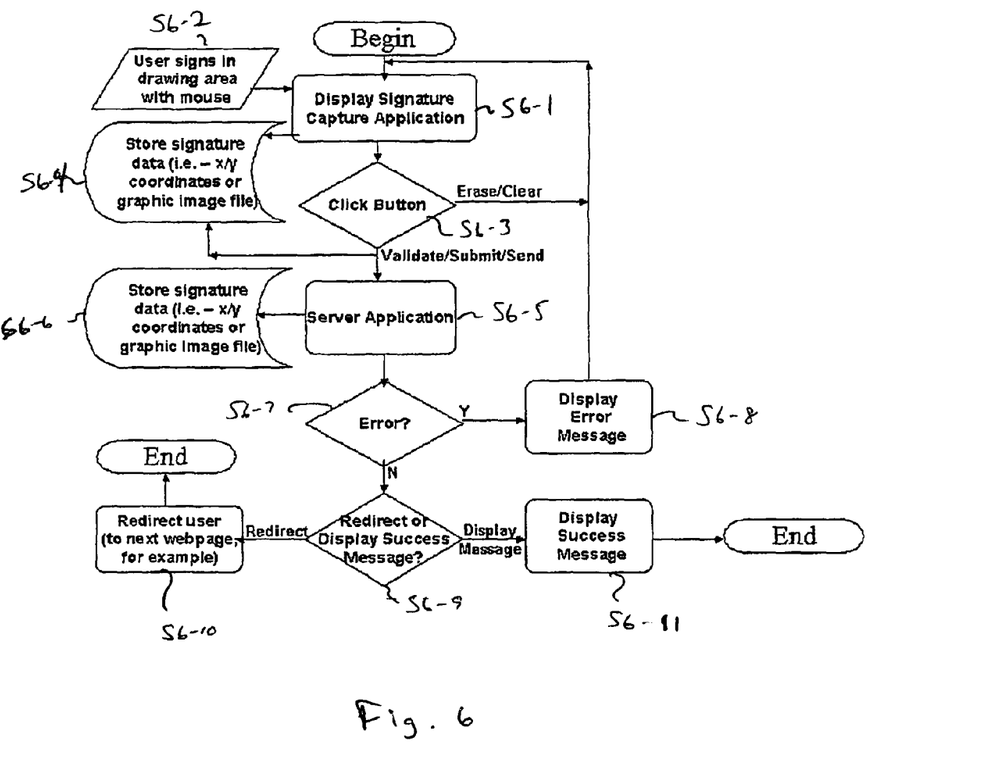
FIG. 6 is a flow chart of a real-time online electronic, biometrically accurate signature capture process according to an embodiment of the present invention.

FIG. 6 is a flowchart of a method for capturing an online electronic signature. The method may be implemented with systems and programs as described above with reference to FIGS. 1-5.

At step S6-1, when a user accesses a program, web page, etc. which is configured to use an online signature according to an embodiment of the present invention, a signature display block or drawing pad is displayed on the user computer separate from or in connection with the corresponding program, web page, etc. The signature display block or drawing pad is preferably configured to perform at least the signature capture and display process.

At S6-2 the user signs in the drawing via a computer peripheral device, such as a mouse. If the drawing is acceptable to the user, he or she may submit the drawing via a submit function or button (S6-3). At S6-4, stored captured data is sent to a server for storing and/or generation of the graphical signature. As described above, additional information may be submitted with the coordinate data or with the signature image and therefore, the signature capture process may be coordinated with other data entry.

A clear function or button can also be provided. If at step S6-3 the clear function is executed, coordinate data is erased and processing returns to step S6-1.

Data may also be sent directly to a server application upon submission (S6-5). A server application can store the signature coordinate data or generate an appropriate graphical image of the signature for display and/or storage, which may also include other items such as text or data (S6-6). The accompanied data may be stored separately from the graphic image file, such as in a database and/or in a text file and/or in a static HTML "receipt" webpage of the transaction.

If there is a problem (S6-7) with the signature or data related thereto, an error message can be displayed (S6-8) and processing can be returned to step S6-1. Data may be erased or left in place for correction. Otherwise, a final step can be performed (S6-9), such as redirecting the user to another web page, program, etc. (S6-10) or displaying a success message indicating that the transaction is complete and/or the signature has been successfully captured and generated (S6-11).

According to another embodiment of the present invention, the signature capture program could be included within a hosting application as standard functionality or as a plug-in. Web pages could invoke the signature capture feature of the hosting application through standard or browser-specific HTML or XAML.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A computer implemented method for capturing an online electronic, biometric signature for an online transaction, said method comprising steps of:

receiving electronically online content relating to an online transaction at a client computer interface from a first party;

receiving electronically a signature program at said client computer interface from a second party;

executing said signature program module to display a signature block on the client computer interface, said signature program being capable of capturing biometric signature data from a computer input peripheral device of said client computer interface;

said signature program module receiving signature data from said computer peripheral device representing a biometric signature;

generating a graphical image of said biometric signature from said signature data;

storing at least one of said signature data and said graphical image remotely at data storage facilities at said second party, with data relating to said online transaction; and when that said at least one of said signature data and said graphical image is stored with data relating to said online content at data storage facilities at said second party, transmitting a notification to said first party and said client computer interface indicating that the signature has been received;

wherein said program module is executed independently from said online content; and wherein said computer client interface includes a hosting application for displaying said online content to a computer user, and step of executing said program module includes a step of downloading said signature program module from a location different than a location where said online content is stored based on an embedded command in said online content, said signature program module configured to display the signature block on the client computer interface and capture the signature data from a computer peripheral device.

2. The method for capturing an online electronic signature as recited in claim 1, wherein said step of executing said program module includes a step of downloading a signature block program based on link embedded in said online content, said signature block program configured to display the signature block on the client computer interface and capture the signature data from a computer peripheral device.

3. The method for capturing an online electronic signature as recited in claim 1, wherein said signature block module comprises a plug-in to said hosting application.

4. The method for capturing an online electronic signature as recited in claim 1, wherein said signature block module comprises included in said hosting application.

5. The method for capturing an online electronic signature as recited in claim 1, wherein said signature block module comprises embedded in said online content.

6. The method for capturing an online electronic signature as recited in claim 1, wherein said online content comprising an HTML or XAML form and said HTML or XAML form is submitted independent from said execution of said signature program module.

7. The method for capturing an online electronic signature as recited in claim 6, wherein said signature program updates said HTML or XAML form, or a browser cookie, when said one of said signature data and said graphical image is stored.

* * * * *